(12) United States Patent
Byeon et al.

(10) Patent No.: US 12,339,670 B2
(45) Date of Patent: Jun. 24, 2025

(54) MULTI-TRAFFIC CONTROL METHOD FOR PLURALITY OF ROBOTS PERFORMING AUTONOMOUS DRIVING

(71) Applicant: Twinny Co., Ltd., Daejeon (KR)

(72) Inventors: Young Jin Byeon, Daejeon (KR); Sang Su Lee, Daejeon (KR); Jae Yeong An, Daejeon (KR); Dong Woo Seo, Daejeon (KR); Chang Hoon Lee, Daejeon (KR)

(73) Assignee: Twinny Co., Ltd., Daejeon (KR)

( * ) Notice: Subject to any disclaimer, the term of this patent is extended or adjusted under 35 U.S.C. 154(b) by 273 days.

(21) Appl. No.: 18/067,818

(22) Filed: Dec. 19, 2022

(65) Prior Publication Data

US 2024/0152154 A1   May 9, 2024

(30) Foreign Application Priority Data

Nov. 3, 2022  (KR) .................. 10-2022-0145009

(51) Int. Cl.
*G05D 1/02*  (2020.01)
*B25J 5/00*  (2006.01)
(Continued)

(52) U.S. Cl.
CPC ....... *G05D 1/0297* (2013.01); *G05B 19/4155* (2013.01); *G05D 1/0027* (2013.01); *G05B 2219/39167* (2013.01)

(58) Field of Classification Search
CPC ...... B25J 9/1666; B25J 9/1676; B25J 9/1664; B25J 9/1661; B25J 9/1674; B25J 5/02;
(Continued)

(56) References Cited

U.S. PATENT DOCUMENTS 11,086,336 B1 *  8/2021  Bolotski .............. G05D 1/0212
2019/0176328 A1 *  6/2019  Kichkaylo .......... G05D 1/0231
(Continued)

FOREIGN PATENT DOCUMENTS

KR   1020190119237 A   10/2019
KR   10-2263159         6/2021
(Continued)

OTHER PUBLICATIONS

Office Action of Korean Application No. 10-2022-0145009 issued on Nov. 28, 2024.

*Primary Examiner* — Khoi H Tran
*Assistant Examiner* — Alyse Tramanh Tran
(74) *Attorney, Agent, or Firm* — Dinsmore & Shohl LLP; Yongsok Choi, Esq.

(57) ABSTRACT

Disclosed is a method of controlling a server for managing movement schedules of a plurality of robots. The control method includes receiving an occupancy request for at least one node matching a scheduled moving route from at least one of the plurality of robots; setting actually occupied nodes and provisionally occupied nodes of each of the plurality of robots based on the occupancy request; and transmitting occupancy permission information including the set actually occupied node and provisionally occupied node to each of the plurality of robots. In the setting of the actually occupied node and the provisionally occupied node, the actually occupied nodes and the provisionally occupied nodes of each of the plurality of robots are selected so that an actually occupied node of one robot does not overlap an actually occupied node or a provisionally occupied node of another robot.

14 Claims, 7 Drawing Sheets

(51) Int. Cl.
  *B25J 9/16* (2006.01)
  *G05B 19/4155* (2006.01)
  *G05D 1/00* (2024.01)

(58) Field of Classification Search
  CPC ............... B25J 9/0084; G05D 1/0238; G05B 2219/40476; G05B 19/4061; G05B 2219/39082; G05B 2219/39135; G05B 2219/40317; G05B 2219/40477; G05B 2219/40083; G05B 2219/39091; G05B 2219/40442
  See application file for complete search history.

(56) References Cited

U.S. PATENT DOCUMENTS

| | | | |
|---|---|---|---|
| 2019/0310653 A1 | 10/2019 | Lee et al. | |
| 2020/0097013 A1* | 3/2020 | Sadhu | G05B 19/41895 |
| 2023/0063370 A1* | 3/2023 | Li | G06Q 10/047 |
| 2023/0123463 A1* | 4/2023 | Lin | B25J 9/1651 |
| | | | 700/248 |
| 2023/0286156 A1* | 9/2023 | Murray | B25J 9/0084 |
| 2024/0045432 A1 | 2/2024 | Chae et al. | |

FOREIGN PATENT DOCUMENTS

| | | | | |
|---|---|---|---|---|
| KR | 20220099096 A | * | 7/2022 | ............... G05D 1/02 |
| KR | 1020220145144 A | | 10/2022 | |

* cited by examiner

MULTI-TRAFFIC CONTROL METHOD FOR PLURALITY OF ROBOTS PERFORMING AUTONOMOUS DRIVING

CROSS-REFERENCE TO RELATED APPLICATION

This application claims priority to Korean Patent Application No. 10-2022-0145009 filed on Nov. 3, 2022, the entire contents of which are herein incorporated by reference.

FIELD OF THE INVENTION

The present disclosure relates to a method of controlling a server for management that resolves a blockage during autonomous driving of a plurality of robots, and more particularly, to a method of controlling a server that clears a blockage based on a concept of an occupied node.

DISCUSSION OF RELATED ART

As movable robots are commercialized, the need for integrated monitoring of multiple robots in addition to individual robot driving algorithms is emerging.

A method of determining moving routes of each of the plurality of robots so as not to interfere with each other depending on the current locations and destinations of the robots and managing all moving routes of the robots may be considered, but this may not be a realistic strategy because each robot starts/ends its movement at different times.

In addition, when moving routes of all robots constituting the entire system are set globally/macroscopically from the beginning to the end, there are disadvantages of increasing a load and decreasing mobility, and decreasing the ability to resolve local problems due to a complex algorithm.

In particular, in the autonomous driving environment of multiple robots, various state/environmental changes may occur for each robot or moving area, and as a result, a real-time control service is required to flexibly and quickly respond to various variables.

RELATED ART DOCUMENT

Patent Document

Korean Patent No. 10-2263159 (Intelligence Server for Determining Route for Robot and Method for the Same)

SUMMARY OF THE INVENTION

The present disclosure provides a method of controlling a server coordinating route planning, movement, pause, etc., of each robot so that the robots may successfully reach each destination without interfering with each other's moving routes.

The objects of the present disclosure are not limited to the above-described objects, and other objects and advantages of the present disclosure that are not described above can be understood from the following description and will be more clearly understood from the embodiments of the present disclosure. In addition, it may be easily appreciated that objects and advantages of the present disclosure may be realized by means described in the claims and a combination thereof.

According to an aspect of the present disclosure, a method of controlling a server for managing movement schedules of a plurality of robots includes receiving an occupancy request for at least one node matching a scheduled moving route from at least one of the plurality of robots; setting actually occupied nodes and provisionally occupied nodes of each of the plurality of robots based on the occupancy request; and transmitting occupancy permission information including the set actually occupied nodes and provisionally occupied nodes to each of the plurality of robots. In the setting of the actually occupied node and the provisionally occupied node, the actually occupied nodes and the provisionally occupied nodes of each of the plurality of robots are selected so that an actually occupied node of one robot does not overlap an actually occupied node or a provisionally occupied node of another node.

In the setting of the actually occupied node and the provisionally occupied node, for each robot, an actually occupied node included in a scheduled moving route may be selected, and for each robot, at least one provisionally occupied node that is not the actually occupied node but is adjacent to the actually occupied node may be selected. The number of provisionally occupied nodes adjacent to the actually occupied node may vary depending on a size of the robot.

In the setting of the actually occupied node and the provisionally occupied node, for each robot, an actually occupied node included in a scheduled moving route may be selected, and for each robot, at least one provisionally occupied node that is not the actually occupied node but is adjacent to the actually occupied node may be selected. The number of provisionally occupied nodes varies depending on whether at least one preset object related to a task of the robot is present within a certain distance from the actually occupied node.

The method may further include transmitting a standby request to at least one robot when the actually occupied node of the one robot according to the scheduled moving route overlaps the actually occupied node or the provisionally occupied node of another node. The setting of the actually occupied node and the provisionally occupied node may include changing the scheduled moving route under the condition that the actually occupied node of the one robot does not overlap the actually occupied nodes of the other robots when the overlapping of the actually occupied nodes is not resolved according to the standby request and selecting the actually occupied node and the provisionally occupied node according to the changed moving route.

The changing of the scheduled moving route may include selecting at least one target robot among robots related to the overlapping of the actually occupied nodes, and changing a moving route of the selected target robot so that the actually occupied node of the selected target robot does not overlap actually occupied nodes of other robots.

In the selecting of the target robot, the robots related to the overlapping of the actually occupied nodes may be divided into two groups whose moving routes conflict with each other, among the two groups, robots included in a group having a lower moving cost added according to a change in a moving route may be selected as target robots. The movement cost is proportional to the number of nodes the robot moves.

In the selecting of the target robot, among the robots related to the overlapping of the actually occupied nodes, at least one robot having the largest number of unoccupied neighboring nodes may be selected as a target robot.

In the changing of the moving route of the target robot, a temporary moving route of the target robot may be set so that the actually occupied node of the target robot does not overlap the actually occupied nodes or the provisionally occupied nodes of the other robots.

In the setting of the actually occupied nodes and the provisionally occupied nodes of each of the plurality of robots, the actually occupied nodes and the provisionally occupied nodes of each of the plurality of robots may be set on the premise that one or more occupancy requests are received for each certain cycle. In the setting of the actually occupied nodes and the provisionally occupied nodes of each of the plurality of robots, the actually occupied nodes and the provisionally occupied nodes of each of the plurality of robots may be set based on a moving distance of each robot scheduled for a time matching the certain cycle.

The method may further include decreasing the certain cycle when a frequency at which the changing of the scheduled moving route is performed is greater than or equal to a first threshold frequency; and increasing the certain cycle when the frequency at which the changing of the scheduled moving route is performed is less than a second threshold frequency smaller than the first threshold frequency.

The method may further include, when there is a disabled robot that does not move, setting an actually occupied node and a provisionally occupied node of the disabled robot based on a location of the disabled robot. In the setting of the actually occupied node and the provisionally occupied node, the moving routes and the actually occupied nodes of the other robots may be selected so as not to overlap the actually occupied node or the provisionally occupied node of the disabled robot.

DETAILED DESCRIPTION OF EXEMPLARY EMBODIMENTS

Figure 1:
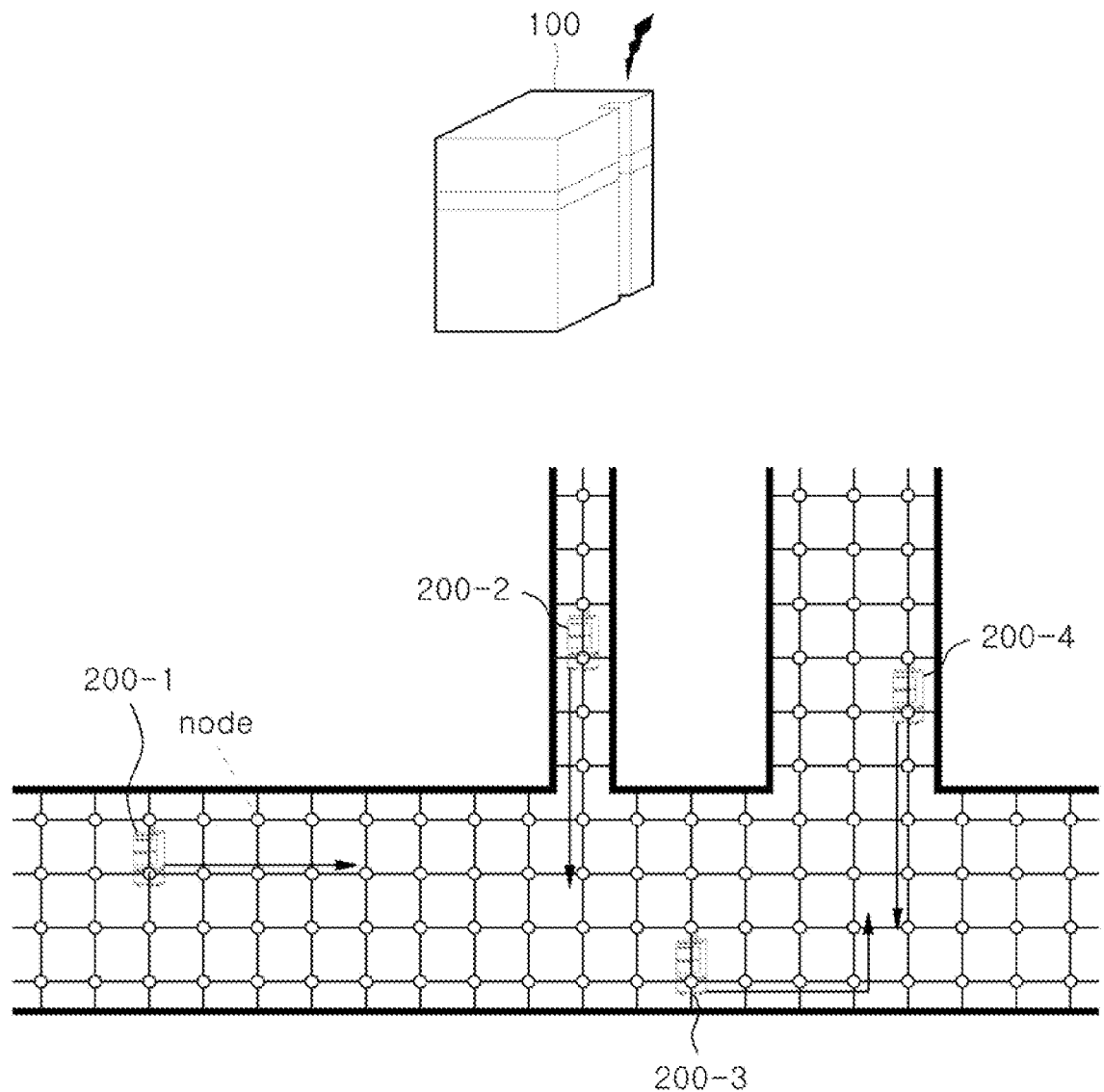
FIG. 1 is a diagram for schematically describing an operation of a server controlling a plurality of robots based on the concept of node occupation according to an embodiment of the present disclosure.

Prior to a detailed description of the present disclosure, a method of describing the present specification and drawings will be described.

First, terms used in the present specification and claims are selected from general terms in consideration of functions in various embodiments of the present disclosure. However, these terms may vary depending on an intention of a person skilled in the art, a legal or technical interpretation, the appearance of new technologies, and the like. Also, some terms are arbitrarily selected by the applicant. These terms may be interpreted with meanings defined in the present specification, and may be interpreted based on the general content of the present specification and common technical knowledge in the art as long as the terms are specifically defined.

In addition, throughout the accompanying drawings of the specification, the same reference numerals denote parts or components performing substantially the same functions. For convenience of explanation and understanding, different embodiments will be described using the same reference numerals. That is, even if all the components having the same reference numerals are illustrated in a plurality of drawings, the plurality of drawings do not represent one embodiment.

In addition, in the present specification and claims, terms including ordinal numbers such as "first" and "second" may be used to distinguish between elements. These ordinal numbers are used to distinguish the same or similar components from each other, and the meanings of the terms should not be construed as being limited due to the use of these ordinal numbers. For example, the order of use, the order of arrangement, and the like of elements associated with such ordinal numbers should not be limited by the numbers. If necessary, the ordinal numbers may be used interchangeably.

In the present specification, singular forms include plural forms unless the context clearly indicates otherwise. It will be further understood that the terms "include" and "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

Terms such as "module," "unit," and "part" used in the present document are terms used to refer to components that perform at least one function or operation, and these components may be implemented in hardware or software or implemented as a combination of hardware and software. In addition, a plurality of "modules," "units," "parts," and the like may be integrated into at least one module or chip to be implemented in at least one processor, except when one of them needs to be implemented as individual specific hardware.

In addition, in an embodiment of the disclosure, a case in which any portion is referred to as being "connected to" another portion not only includes a case in which any one portion and another portion are "directly connected to" each other, but also includes a case in which any one portion and another portion are "indirectly connected to" each other through still another portion. In addition, unless explicitly described otherwise, "including" any components will be understood to mean that other components may be included rather than other components being excluded.

FIG. 1 is a diagram for schematically describing an operation of a server controlling a plurality of robots based on the concept of node occupation according to an embodiment of the present disclosure.

Referring to FIG. 1, a server 100 may communicate with a plurality of robots 200-1, 2, 3, 4, . . . . The server 100 may be implemented as one or more computers or systems, and may monitor locations, moving routes, etc., of each robot according to various time units/distance units.

Each robot may correspond to a movable robot having various functions, such as a delivery robot, a guide robot, a cleaning robot, and a boarding robot. Each robot may drive based on an autonomous driving algorithm. In this case, a location change may be controlled based on communication with the server 100, etc.

Each robot is representative of a form of moving on land by driving moving means such as at least one wheel or leg, but robots that move on the sea or in the air are not excluded as long as the concept of an occupied node to be described later may be applied.

As an embodiment, when at least one of the plurality of robots 200-1, 2, 3, 4, . . . passes through or moves to a specific location (node), the robots may transmit an occupancy request to inquire whether the robot can occupy the corresponding location to the server 100.

In this case, the server 100 may set an occupied node (e.g., an actually occupied node or a provisionally occupied node) for each of the plurality of robots 200-1, 2, 3, 4, . . . in order to coordinate so that overlap or the like between locations occupied by the robots 200-1, 2, 3, 4, . . . does not occur.

Here, a node is a unit point or unit region constituting moving routes in a corresponding area within an area where a plurality of robots operate. That is, each robot may be located on at least one node and may pass through at least one node for movement.

For example, referring to FIG. 1, nodes defined at regular intervals on a route along which the plurality of robots 200-1, 2, 3, 4, . . . move are illustrated. Meanwhile, instead of nodes of each point as illustrated in FIG. 1, an embodiment in which each region divided in a lattice form is defined as nodes is also possible.

Map information of a corresponding area including information on nodes is stored in each of the server 100 and a robot.

When occupancy permission information including information on the occupancy node set in this way is transmitted to a robot, the robot may occupy the corresponding node, and move in this way.

Figure 2A:
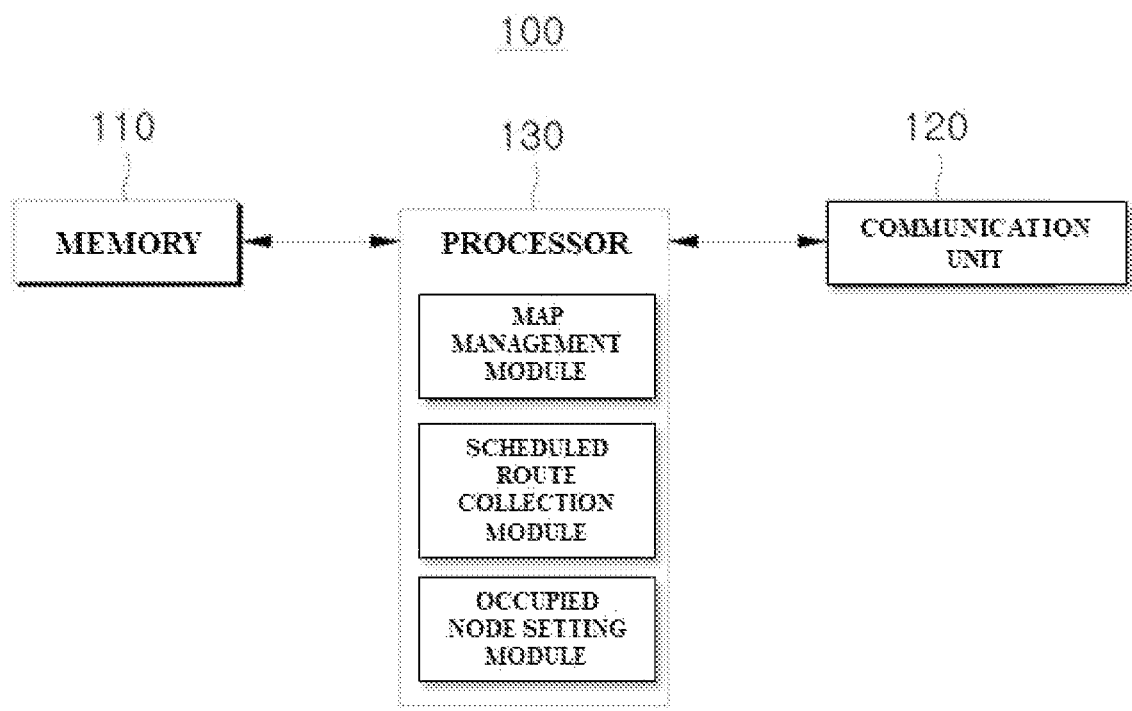
FIG. 2A is a block diagram for describing a configuration of the server according to the embodiment of the present disclosure.

FIG. 2A is a block diagram for describing a configuration of the server according to the embodiment of the present disclosure.

Referring to FIG. 2A, the server 100 may include a memory 110, a communication unit 120, a processor 130, etc.

The memory 110 may be a component for storing an operating system (OS) for controlling an overall operation of the server 100 and at least one instruction or data related to the components of the server 100.

The memory 110 may include a non-volatile memory such as a read only memory (ROM) and a flash memory, and may include a volatile memory such as a dynamic random access memory (DRAM). In addition, the memory 110 may include a hard disk, a solid state drive (SSD), etc.

The communication unit 120 may include a circuit, a module, a chip, etc., for performing communication with at least one external device through various wired/wireless communication methods. In terms of securing mobility of robots, the communication unit 120 may include various circuits/modules/chips for performing wireless communication.

The communication unit 120 may be connected to external devices through various networks.

The network may be a personal area network (PAN), a local area network (LAN), a wide area network (WAN), etc., depending on a region or a scale, and may be an intranet, an extranet, the Internet, etc., depending on the openness of the network.

The communication unit 120 may be connected to external devices through various wireless communication methods such as Long-Term Evolution (LTE), LTE Advanced (LTE-A), 5th generation (5G) mobile communication, code division multiple access (CDMA), wideband CDMA (WCDMA), Universal Mobile Telecommunications System (UMTS), wireless broadband (WiBro), Global System for Mobile Communications (GSM), time division multiple access (DMA), Wi-Fi, WiFi Direct, Bluetooth, near field communication (NFC), ZigBee, etc.

The processor 130 is a component for controlling overall operations of the server 100. Specifically, the processor 130 is connected to the memory 110, and may perform operations according to various embodiments of the present disclosure by executing at least one instruction stored in the memory 110.

The processor 130 may be a general purpose processor such as a central processing unit (CPU), an application processor (AP), or a digital signal processor (DSP), a graphics-only processors such as a graphics processing unit (GPU) or a vision processing unit (VPU), an artificial intelligence-only processor such as a neural processing unit (NPU), etc. The artificial intelligence-only processor may be designed as a hardware structure specialized for training or use of a specific artificial intelligence model.

Referring to FIG. 2A, the processor 130 may control a map management module 131, a scheduled route collection module 132, an occupied node setting module 133, etc. Each of these modules may be implemented in software and/or hardware. However, since these modules of FIG. 2A correspond to an example in which the functions of the processor 130 are divided, the functional blocks of the processor 130 do not necessarily have to be divided like these modules of FIG. 2A.

The map management module 131 is a module for managing map information of an area where the plurality of robots 200-1, 2, 3, 4, . . . drive.

The map information may include locations (e.g., coordinates), a route width, a route length, a direction, and the like of each moving route included in the corresponding area. In addition, the map information may include information on a plurality of nodes on a moving route. Information on a node may include locations (coordinates) of each node, intervals from adjacent nodes, and the like. Also, when a node is defined as a region rather than a point, the information on the node may further include the size and shape of the node.

The nodes are typically defined to match each point arranged at regular intervals as illustrated in FIG. 1, but are not limited thereto and may be defined in various ways. For example, when a moving route is divided into a rectangular lattice form, each divided region may be a node. Intervals and arrangements between nodes may be set according to regular intervals and patterns, but it is also possible for the intervals between nodes or the arrangement pattern to vary for each area.

The intervals between the nodes (between centers of the nodes) may be set according to the size of each driving robot. For example, the intervals between the nodes may be set so that a horizontal width of a robot does not exceed half of the interval between nodes.

As an embodiment, when route change information related to addition/change/removal of a moving route in an area is obtained, the map management module 131 may update map information based on the route change information. In this case, as the configuration of the moving route changes, nodes included in each moving route may also be added/changed/removed.

The scheduled route collection module 132 is a module for collecting scheduled routes of each robot.

The scheduled route collection module 132 may obtain a scheduled route of a robot based on an occupancy request received from a robot that intends to occupy at least one node during the movement process. Here, the occupancy request may include information on a scheduled route along which a robot moves.

For example, the scheduled route collection module 132 may identify scheduled routes of each robot at regular intervals. In this case, for each cycle, the scheduled route collection module 132 may identify a scheduled route based on scheduled moving distances of each robot for a time matching a cycle.

As another example, the scheduled route collection module 132 may identify a scheduled route of each robot as an occupancy request is received from at least one of a plurality of robots.

The occupied node setting module 133 is a module for setting occupied nodes occupied by each robot. For example, the occupied node setting module 133 may update and set the occupied nodes of each robot for each certain cycle described above. When the occupancy permission information is transmitted to a robot as the occupancy node is set, the robot may move through the corresponding node.

The occupied nodes may be divided into actually occupied nodes and provisionally occupied nodes. The concept of an actually occupied node includes not only a node currently occupied by a robot, but also a node that the robot will actually occupy according to the scheduled route.

In addition, actually occupied nodes may also include a node that may not be occupied by any other robot due to the presence of the robot. For example, while a robot passes through a narrow road where the robot may only travel in one direction, the entire narrow road may be set as the actually occupied node.

The provisionally occupied node is not the actually occupied node, but corresponds to a node that may become difficult for other robots to occupy as a robot actually occupies a specific node. For example, all nodes immediately adjacent to the actually occupied node may be configured as the provisionally occupied nodes.

The number of provisionally occupied nodes set based on one actually occupied node may vary depending on the size of the robot.

As a specific example, since the case in which an area occupied by a robot may overlap other adjacent nodes (e.g., situation where a volume of a robot invades a position closer to a center of an adjacent node than a center of a node where the robot is currently located) may occur according to a horizontal width of a robot, it is possible to prevent a collision between the robots. For example, when a horizontal width of a robot is greater than half of the distance between the centers of two adjacent nodes, this is because robots may not both be located at the same time at two nodes described above.

In addition, even if the physical overlap/collision does not occur according to the horizontal width of the robot, variables (e.g., density increase, sensor overoperation, task interruption, etc.) that may occur due to excessive proximity between robots may be prevented by utilizing the provisionally occupied node concept.

In this regard, the number of provisionally occupied nodes set based on one actually occupied node may vary depending on the presence or absence of at least one preset object that is actually close to (e.g., within a certain distance from) the occupied node. That is, the range of provisionally occupied nodes may be set according to the surrounding environment in which the robot is located or nearby objects, in addition to the size of the robot.

Here, the preset object may be any of various objects related to at least one task performed by the robot. Here, the task may include any of various tasks such as charging of a robot, loading/unloading of shipments by a robot, moving/turning of a robot, interaction between a robot and a user, automatic transformation of a robot, etc.

Specifically, the preset object may correspond to any of various objects related to a task of a robot such as a station where the robot is charged, a logistics conveyor, a cradle, an obstacle, and a user.

In this case, the range in which the provisionally occupied node is set when each node is actually occupied may vary according to the location of the node. For example, at a location close to the station where the robot is charged, a range of provisionally occupied nodes may be set relatively wide, such as setting the provisionally occupied node up to a second node adjacent to a first node in addition to the first node adjacent to the actually occupied node. As a result, a collision or interference may be prevented in the process of performing station docking. In addition to the station, the range of provisionally occupied nodes may be set wider in locations close to the preset objects such as the logistics conveyors or the cradle. In this case, of course, the range in which the provisionally occupied nodes are set may vary depending on the type of the preset objects.

Figure 2B:
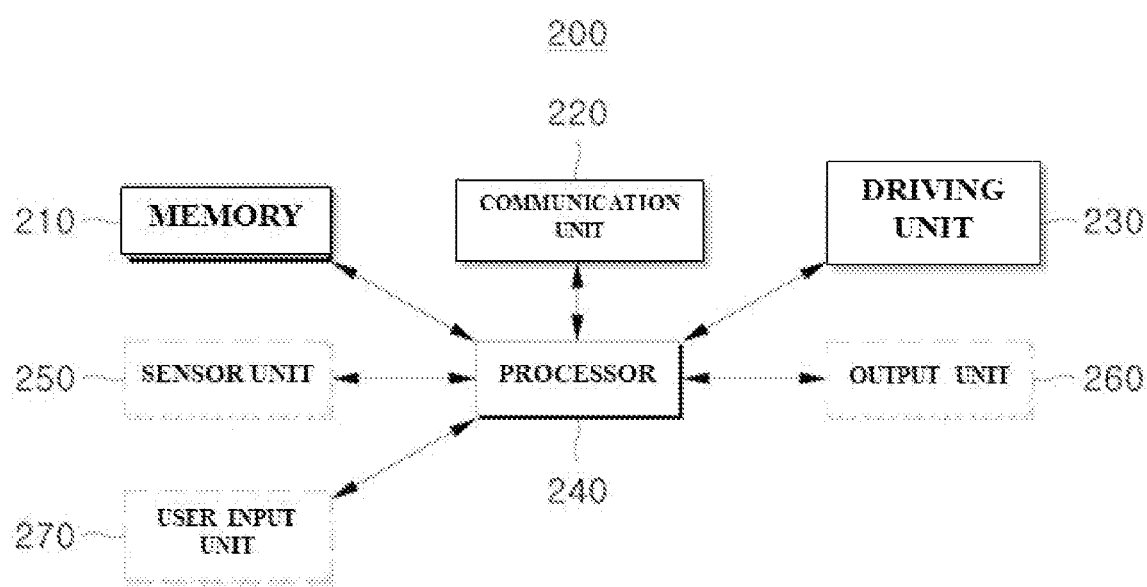
FIG. 2B is a block diagram for describing a configuration of a robot according to an embodiment of the present disclosure.

Meanwhile, FIG. 2B is a block diagram for describing a configuration of a robot according to an embodiment of the present disclosure. A robot 200 of FIG. 2B may correspond to each robot illustrated in FIG. 1.

Referring to FIG. 2B, the robot 200 may include a memory 210, a communication unit 220, a driving unit 230, a processor 240, a sensor unit 250, an output unit 260, a user input unit 270, and the like.

The memory 210 may be a component for storing an OS for controlling an overall operation of components of the robot 200 and at least one instruction or data related to the components of the robot 200.

The communication unit 220 may include a circuit, a module, a chip, etc., for performing communication with at least one external device through various wired/wireless communication methods. To secure the mobility of the robot 200, the communication unit 220 may include various circuits/modules/chips for performing wireless communication.

The driving unit 230 is a component for driving the movement of the robot 200. The driving unit 230 may correspond to a module implemented in software and/or hardware.

For example, the driving unit 230 may control a motor for driving a wheel of the robot 200 and may control a mechanical configuration for controlling a direction of the wheel. For example, straight-line driving, curved driving, rotation, etc. of a wheel may be controlled.

The processor 240 is a component for controlling overall operations of the robot 200. The processor 240 may be a general purpose processor such as a CPU, an AP, or a DSP, a graphics-only processor such as a GPU or a VPU, an artificial intelligence-only processor such as an NPU, etc.

The sensor unit 250 is a component for collecting various types of information related to the movement of the robot 200 and the surrounding environment.

The sensor unit 250 may include various sensors such as an acceleration sensor, a gyro sensor, and a geomagnetic sensor for self-measuring the moving situation of the robot 200 (e.g., moving direction, moving speed, degree of inclination, received impact, etc.).

In addition, the sensor unit 250 may include a LiDAR sensor for detecting a surrounding topography, an ultrasonic sensor for detecting a nearby object, a microphone for detecting ambient noise or objects in various directions, etc.

Also, the sensor unit 250 may include at least one camera for capturing an image of the surroundings of the robot 200. A camera may include one or more image sensors. The camera may include an RGB camera or may include a depth camera.

The output unit 260 is a component for visually/audibly outputting various types of information. The output unit 260 may include a display, a light emitting diode (LED), a speaker, etc.

The user input unit 270 is a component for receiving various user commands or information. The user input unit 270 may include at least one button, a touch pad, a microphone, a camera (face recognition, motion sensing), and the like.

Through the following drawings, the operation of the server that controls the movement schedule of a plurality of robots will be described in detail.

Figure 3:
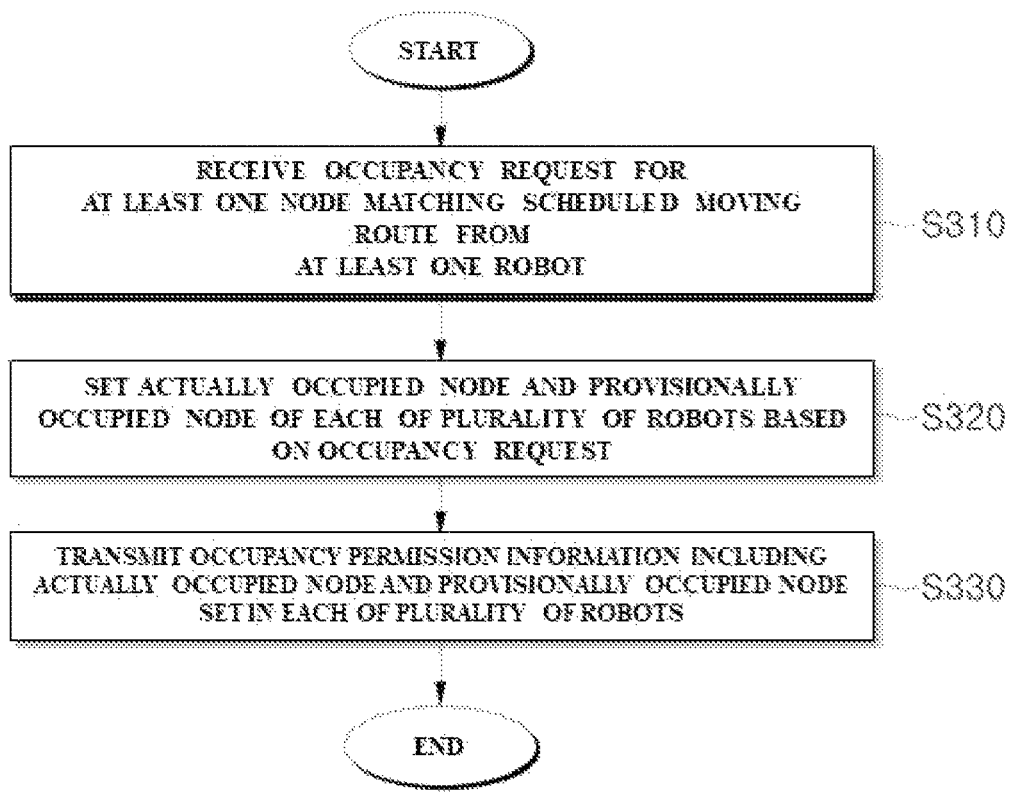
FIG. 3 is a flowchart for describing the operation of the server according to the embodiment of the present disclosure.

FIG. 3 is a flowchart for describing the operation of the server according to the embodiment of the present disclosure.

Referring to FIG. 3, the server 100 may receive an occupancy request for at least one node from at least one robot (S310).

The occupancy request corresponds to a request to occupy at least one node included in a moving route scheduled for a corresponding robot. Specifically, the occupancy request may be an occupancy request for at least one node through which a robot should pass within a certain time (for a certain time from a current point in time) according to a scheduled moving route.

The scheduled moving route is set according to a destination of a robot, and may be derived through the server 100 or may be determined by the robot itself.

The server 100 may set the actual occupied nodes and the provisionally occupied nodes of each of the plurality of robots based on the received occupancy request (S320).

As an embodiment, the server 100 may set the actually occupied nodes and the provisionally occupied nodes of each of the plurality of robots for each cycle. However, this operation may be performed on the premise that one or more occupancy requests are received for each cycle. This reflects the fact that there is no need to newly set the actually occupied node and the provisionally occupied node when no occupancy request is received. Alternatively, the server 100 may set the actually occupied nodes and the provisionally occupied nodes of each of the plurality of robots on the assumption that the occupancy request is received from at least one of the plurality of robots regardless of the cycle.

Based on the scheduled moving route of the robot that has transmitted the occupancy request, the server 100 may set the node constituting the moving route as the actually occupied node of the robot, and set the node adjacent to the actually occupied node that is not the actually occupied node as the provisionally occupied node.

Here, the actually occupied node may also include a node that may not be occupied by any other robot due to the presence of the robot. For example, while a robot passes through a narrow road where the robot may only travel in one direction, the entire narrow road may be set as the actually occupied node.

Meanwhile, the number of provisionally occupied nodes adjacent to the actually occupied node may vary depending on the size of the robot. For example, when a horizontal area of a robot is a first area, only nodes that are in direct contact with the actually occupied node may be set as provisionally occupied nodes, but when the horizontal area of the robot is a second area larger than the first area, in addition to adjacent nodes that are in direct contact with the actually occupied node, nodes that are in direct contact with adjacent nodes may also be additionally set as provisionally occupied nodes.

However, in this process, the server 100 may select the actually occupied nodes and the provisionally occupied nodes of each of the plurality of robots so that an actually occupied node of one robot does not overlap an actually occupied node or a provisionally occupied node of another node.

Figure 4:
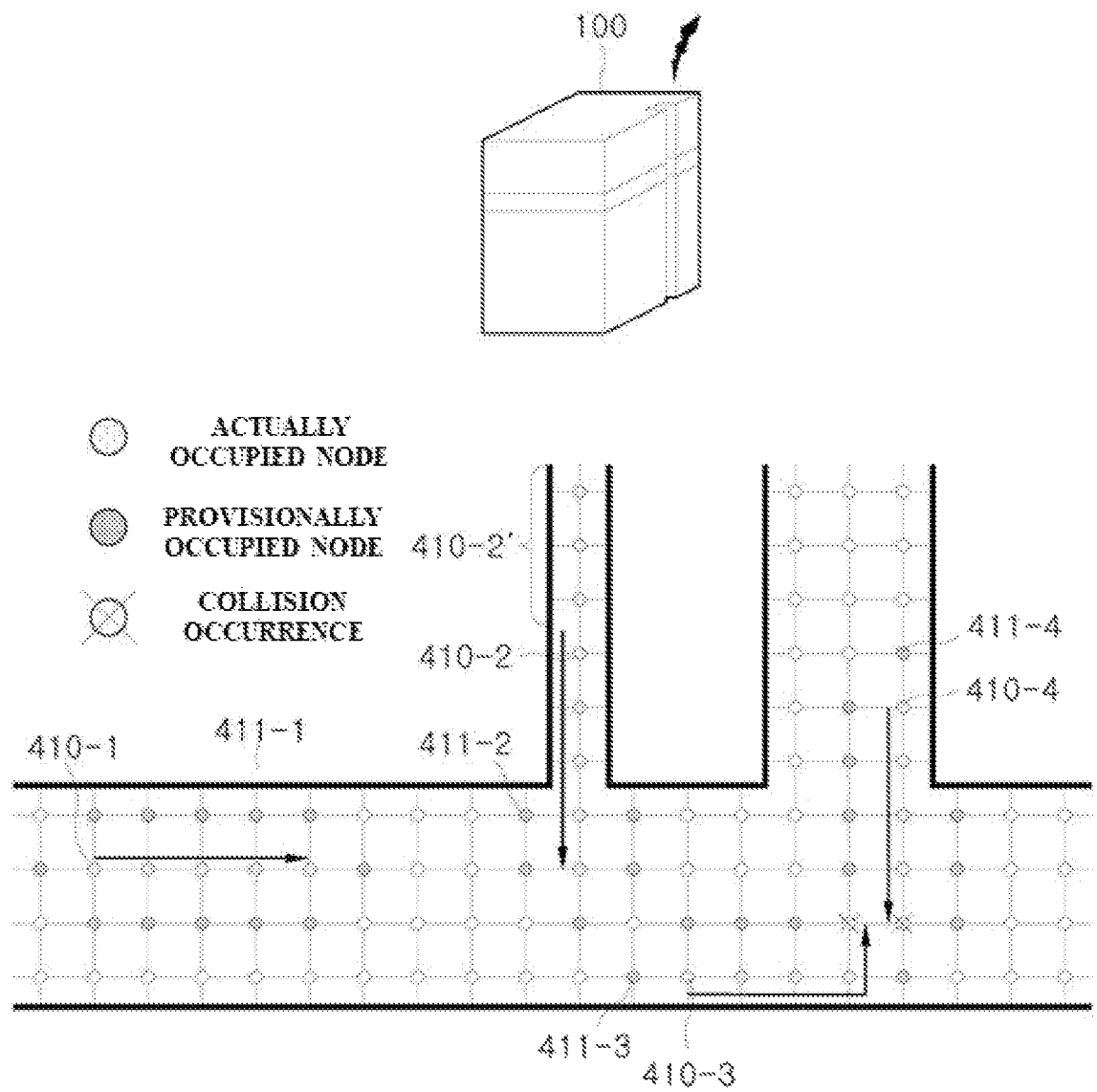
FIG. 4 is a diagram for describing the operation of the server determining whether occupied nodes overlap each other according to an embodiment of the present disclosure.

In this regard, FIG. 4 is a diagram for the describing the operation of the server determining whether the occupied nodes overlap each other according to the embodiment of the present disclosure.

Referring to FIG. 4, actually occupied nodes may each be set according to a scheduled moving route (arrow) of each robot 200-1, 2, 3, and 4 illustrated in FIG. 1. In this case, only nodes scheduled to move for a certain period of time based on the current point in the scheduled movement route may be set as actually occupied nodes.

Here, the certain time may be the same as a cycle in which the server 100 sets the actually occupied nodes and the provisionally occupied nodes of each robot. In addition, based on the moving distances of each robot scheduled for a time matching the cycle, the actually occupied nodes and the additionally occupied nodes of each of the plurality of robots may be set.

As a result, actually occupied nodes 410-1 for a robot 200-1, actually occupied nodes 410-2 for a robot 200-2, actually occupied nodes 410-3 for a robot 200-3, and actually occupied nodes 410-4 for a robot 200-4 may each be set.

Meanwhile, depending on a width of a route where a robot is located, it is possible that a node not included in the scheduled moving route is set as an actually occupied node. For example, referring to FIG. 4, a width of a route where the robot 200-3 is located corresponds to a narrow width (e.g., less than a threshold width) that only one robot can pass through. Here, the server 100 may set all nodes included in the corresponding route as the actually occupied node of the robot 200-3. As a result, nodes 410-2' not actually included in the scheduled moving route (arrow) for the robot 200-3 may also be set as actually occupied nodes.

Also, referring to FIG. 4, nodes in direct contact with each actually occupied node may be set as provisionally occupied nodes. Specifically, provisionally occupied nodes 411-1 adjacent to actually occupied nodes 410-1, provisionally occupied nodes 411-2 adjacent to actually occupied nodes 410-2, actually occupied nodes 411-3 adjacent to actually occupied nodes 411-3, and provisionally occupied nodes 411-4 adjacent to actually occupied nodes 410-4 may each be set.

However, referring to FIG. 4, one of the actually occupied nodes 410-3 that may be set for the robot 200-3 overlaps one of the provisionally occupied nodes 411 that may be set for the robot 200-4, and one of the actually occupied nodes 410-4 that may be set for the robot 200-4 overlaps provisionally occupied nodes 411-3 that may be set for the robot 200-3.

As such, when an actually occupied node of one robot overlaps an actually occupied node or a provisionally occupied node of another node, the server 100 may transmit a standby request for a certain time to at least one robot related to the overlapping of the occupied nodes. In this case, the standby request may be transmitted to at least one robot, and the occupancy permission information (movement command) may be transmitted only to other robots. For example, in FIG. 4, the server 100 may transmit the standby request to one of the robots 200-3 and 200-4.

However, when the overlapping or blockage of occupied nodes may not be resolved due to temporary standby, the server 100 may identify that a deadlock event has occurred.

For example, as a result of transmitting the standby request, when the overlapping of the actually occupied nodes related to the corresponding robot is not resolved even though the robot performs standby (e.g., when the overlapping of the actually occupied nodes is still not resolved within the next two cycles), the server 100 may identify that the deadlock event has occurred.

Alternatively, when it is identified that the overlapping of the occupied nodes may not be resolved even if one robot performs standby, the server 100 may identify that the deadlock event has occurred.

In this case, the server 100 may change the scheduled moving route under the condition that the actually occupied node of one robot does not overlap the actually occupied node of another robot. Also, the server 100 may select the actually occupied node and the provisionally occupied node according to the changed moving route.

Specifically, the server 100 may select at least one of robots related to the overlapping of the actually occupied nodes, and change the moving route of the selected target robot so that the actually occupied node of the selected target robot does not overlap actually occupied nodes of other robots.

For example, the server 100 may divide the robots related to the overlapping of the actually occupied nodes into two groups whose moving routes conflict with each other, and among the two groups, select, as target robots, robots included in the group with the smaller moving cost added according to the change in the moving route among the two groups. Here, the movement cost corresponds to a concept proportional to the number of nodes the robot moves.

Figure 5A:
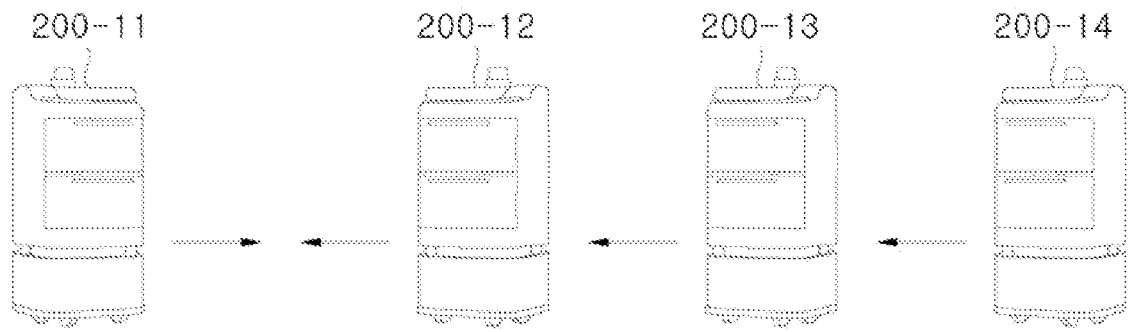
FIGS. 5A to 5C are diagrams for describing an operation in which a server changes a moving route or an occupied node of at least one robot according to a deadlock occurrence aspect according to various embodiments of the present disclosure.
Figure 5B:
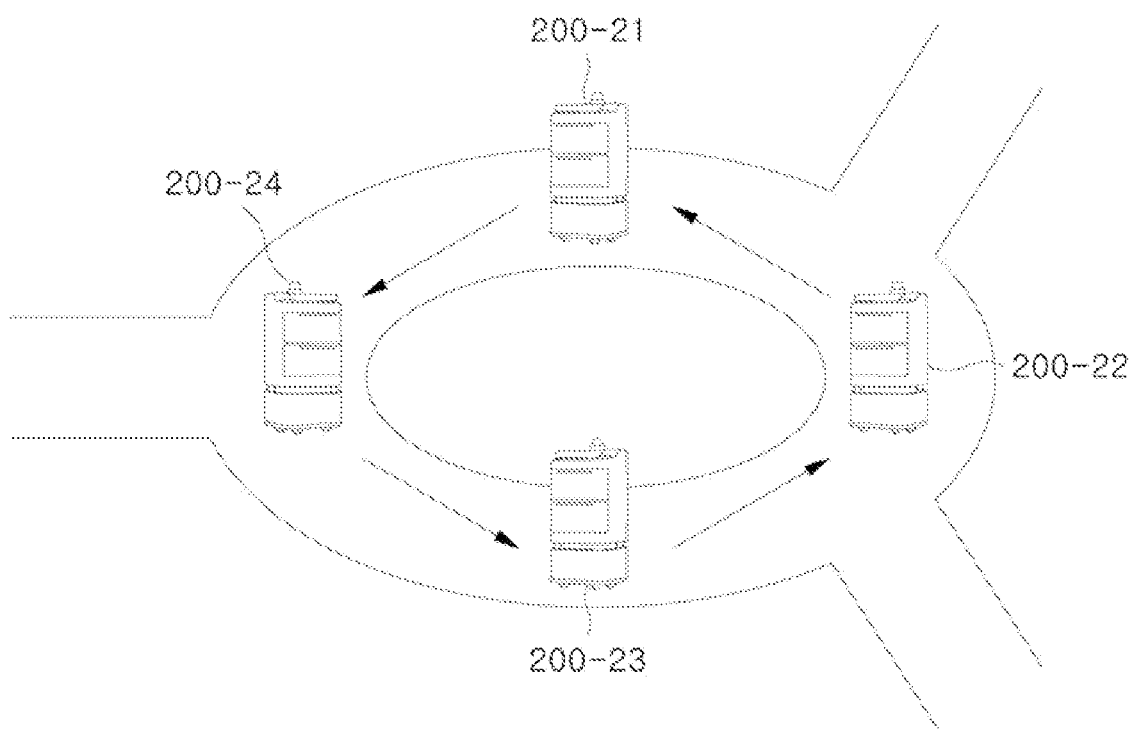
Figure 5C:
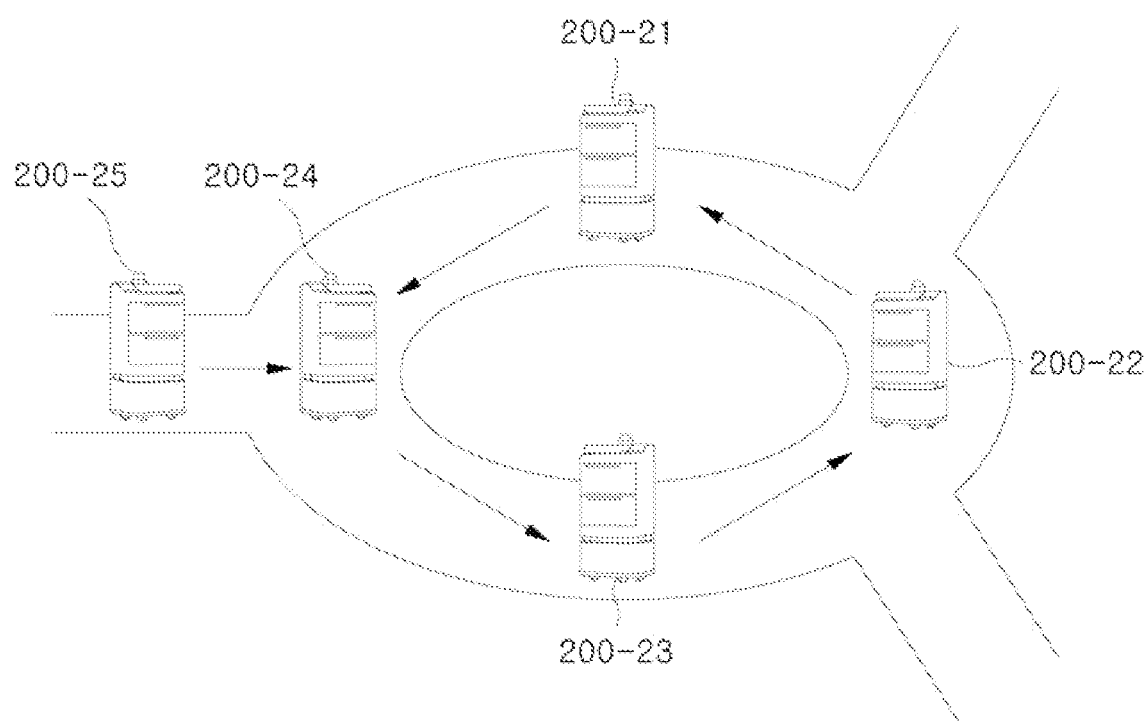

In this regard, FIGS. 5A to 5C are diagrams for describing an operation in which the server changes the moving route or the occupied node of at least one robot according to the deadlock occurrence aspect according to various embodiments of the present disclosure.

First, FIG. 5A illustrates a case where a linear deadlock event occurs. Referring to FIG. 5A, the moving direction of the robot 200-11 is opposite to that of the robots 200-12, 13, and 14, and therefore these robots may not move because their routes are blocked.

Specifically, this corresponds to a state in which two or more actually occupied nodes among the robots 200-11, 12, 13, and 14 overlap each other, and therefore the robots 200-11, 12, 13, and 14 cannot move, and a state in which the situation is not resolved by the standby of one robot.

In this case, the server 100 may divide robots into two groups conflicting with each other according to the scheduled moving route (moving direction) of the robots 200-11, 12, 13, and 14. As a result, the robot 200-11 alone is included in one group, and the remaining robots 200-12, 13, and 14 are included in another group.

Here, the server 100 may select a group having a lower moving cost according to the change in the moving route among the two groups. Since the movement cost is lower when one robot moves than when three robots move, the server 100 can select the group including the robot 200-11, and as a result, the robot 200-11 may be selected as a target robot.

In this case, the moving route of the robot 200-11 selected as the target robot may change. Specifically, the server 100 may set a temporary moving route of the target robot 200-11 so as not to overlap the actually occupied nodes or the provisionally occupied nodes related to the moving routes of the robots 200-12, 13, and 14.

Meanwhile, FIG. 5B illustrates the case where the linear deadlock event occurs. Referring to FIG. 5B, since the robots 200-21, 22, 23, and 24 each block the moving routes of the robots following in sequence, the actually occupied nodes overlap each other, and the situation may not resolved by the temporary standby of at least one robot.

In the case of FIG. 5B, since the robots are not divided into two groups according to the scheduled moving route, it may be converted into the linear deadlock problem as illustrated in FIG. 5A as the selection of one robot is selected first.

Specifically, the server 100 may select at least one robot having the largest number of unoccupied neighboring nodes among the robots 200-21, 22, 23, and 24 as a target robot. That is, the robot with the easiest movement may be selected.

For example, referring to FIG. 5B, among the robots 200-21, 22, 23, and 24, the robot 200-24 closest to other routes may be selected, and the deadlock event may be interpreted as a conflict between the robot 200-24 and the remaining robots 200-21, 22, and 23.

In this case, the server 100 may change the actually occupied node and the provisionally occupied node by setting the temporary moving route for the robot 200-24 which is the target robot. As a result, the moving route of the robot 200-24 may change to enter another route connected to a circular route, and as a result, the actually occupied node, the provisionally occupied node, etc., may change.

Meanwhile, as illustrated in FIG. 5C, the form in which the linear deadlock and the circular deadlock coexist is also possible.

In this case, the server 100 may first divide the corresponding robots 200-21, 22, 23, 24, and 25 into a linear deadlock part and a circular deadlock part.

Specifically, it may be identified that the robot 200-25 is blocked by the robot 200-24, the robot 200-24 is blocked by the robot 200-23, the robot 200-23 is blocked by the robot 200-22, the robot 200-22 is blocked by the robot 200-21, and the robot 200-21 is blocked by the robot 200-24. In this case, starting from the robot 200-24, which is a reference point of the circulation of the blocking relationship, the robots 200-24, 23, 22, and 21 may be divided into the circular deadlock part, and the robots 200-25 and 24 may be divided into the linear deadlock part.

In this case, the server 100 may select, as a target robot, a node (e.g., the robot with the smallest number of occupied nodes (by other robots) among neighboring nodes) that moves the most easily among the robots constituting the circular deadlock. In this case, the server 100 may change the form of the target robot from the circular deadlock to the linear deadlock, divide the target robot into two groups, and change the moving route of the group with the low moving cost. As a result, the circular deadlock part and the linear deadlock part constituting the complex deadlock may be sequentially resolved.

When the actually occupied node and the provisionally occupied node are set for each of the plurality of robots according to at least one of various embodiments described above, the server 100 may transmit, to each robot, the occupancy permission information including the information on the actually occupied node and the provisionally occupied node set for each robot (S330).

As a result, each robot may move according to the moving route including the actually occupied nodes included in the occupancy permission information.

Meanwhile, as in the above-described embodiment, the operation of setting the actually occupied nodes and the provisionally occupied nodes of the plurality of robots may be performed according to a certain cycle.

In this case, the server 100 may update the above-described cycle according to the frequency in which the moving route scheduled for each robot changes according to the deadlock event or the like.

For example, when the frequency at which the scheduled moving route of at least one of the plurality of robots changes according to the overlapping of at least one actually occupied node is equal to or greater than a first threshold frequency, the server 100 may reduce a certain cycle. In this case, the actually occupied nodes and the provisionally occupied nodes for each robot may be set frequently with a shorter cycle, and the occurrence of the deadlock event and the like may be suppressed.

On the other hand, when the above-described frequency is less than a second threshold frequency smaller than the first threshold frequency, the server 100 may increase a certain cycle. As a result, it is possible to reduce the load and communication traffic volume of the server 100.

Meanwhile, in an embodiment, when there is a disabled robot that cannot move, the server 100 may set an actually occupied node and a provisionally occupied node of the disabled robot based on the location of the disabled robot. In this case, the server 100 may select moving routes and actually occupied nodes of other robots so as not to overlap the actually occupied node or the provisionally occupied node of the disabled robot.

Meanwhile, the various embodiments described above may be implemented by combining two or more embodiments as long as they do not conflict or contradict each other.

Meanwhile, the diverse embodiments described above may be implemented in a computer or a computer-readable recording medium using software, hardware, or a combination of software and hardware.

According to a hardware implementation, embodiments described in the disclosure may be implemented using at least one of application specific integrated circuits (ASICs), DSPs, digital signal processing devices (DSPDs), programmable logic devices (PLDs), field programmable gate arrays (FPGAs), processors, controllers, micro-controllers, microprocessors, and electric units for performing other functions.

In some cases, embodiments described in the disclosure may be implemented by the processor 140 itself. According to a software implementation, embodiments such as procedures and functions described in the disclosure may be implemented by separate software modules. Each of the software modules may perform one or more functions and operations described in the disclosure.

Meanwhile, computer instructions or computer programs for performing processing operations of the electronic devices such as the server 100 and the robot 200 according to various embodiments of the disclosure described above may be stored in a non-transitory computer-readable medium. The computer instructions or the computer programs stored in the non-transitory computer-readable medium allow a specific apparatus to perform the processing operations of the electronic devices according to the diverse embodiments described above when they are executed by a processor of the specific apparatus.

The non-transitory computer-readable medium is not a medium that stores data for a short time, such as a register, a cache, a memory, or the like, but is a medium that semi-permanently stores data and is readable by the apparatus. A specific example of the non-transitory computer-readable medium may include a compact disc (CD), a digital versatile disc (DVD), a hard disk, a Blu-ray disc, a Universal Serial Bus (USB), a memory card, a ROM, or the like.

The method of controlling a server according to the present disclosure may quickly and flexibly support resolution of a blockage with a minimum load by setting the actual occupancy/provisional occupancy of each robot for a node based on an occupancy request received in real time.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A method of controlling a plurality of robots travelling in an area composed of a plurality of nodes by a server, the method comprising: determining first information including first nodes and second nodes in a map including a plurality of nodes based on a first path through which a first robot of the plurality of robots moves during a predetermined period of time, the first nodes including nodes constituting the first path and being selected among the plurality of nodes within the area, and each of the plurality of nodes representing a location in the map, and the second nodes include nodes adjacent to the first nodes and are determined according to size of the first robot; determining second information including third nodes and fourth nodes based on a second path through which a second robot of the plurality of robots moves during the predetermined period of time, the third nodes including nodes constituting the second path and being selected among the nodes within the area, and the fourth nodes include nodes adjacent to the third nodes and are determined according to size of the second robot; determining whether any of the first nodes overlap with one of the third nodes or the fourth nodes; and transmitting, by the server, signal including the first information to the first robot and signal including the second information to the second robot in response to determining that none of the first nodes overlap with one of the third nodes or the fourth nodes.

2. The method of claim 1, further comprising: receiving a request for the first information and the second information.

3. The method of claim 1, wherein the first nodes include nodes through which other robots cannot travel by the movement of the first robot, and the third nodes include nodes through which other robots cannot travel by the movement of the second robot.

4. The method of claim 1, wherein the number of the second node is determined according to a presence or absence of an object related to a task of the first robot located proximate to the first nodes, and the number of the fourth nodes is determined according to the presence or absence of an object related to a task of the second robot located proximate to the third nodes.

5. The method of claim 1, further comprising: transmitting, by the server, a waiting request to the first robot or the second robot in response to determining that any of the first nodes overlap with one of the third nodes or the fourth nodes.

6. The method of claim 5, further comprising: changing the first or the second path to a third path when the overlap of the one of the first nodes lasts for a prescribed period.

7. The method of claim 6, wherein the changing comprises: selecting a robot with less cost added by the change of the path among the first and second robots; and changing the path of the robot as the third path.

8. The method of claim 6, wherein the changing comprises: selecting a robot having the largest number of neighboring nodes that are not selected among the first and second robots; and changing the path of the robot as the third path.

9. The method of claim 5, further comprising: determining third information including fifth nodes and sixth nodes based on the third path through which the first or the second robot moves, the fifth nodes including nodes constituting the third path and being selected among the nodes within the area; and transmitting a signal including the third information to the first or the second robot, wherein the sixth nodes include nodes adjacent to the fifth nodes, and one of the fifth nodes is determined not to overlap one of the first or the second nodes, or one of the third or fourth nodes.

10. The method of claim 1, further comprising: determining fourth information including seventh nodes and eighth nodes based on a current position of the first robot when the first robot is impossible to move, the seventh nodes including nodes constituting a path through which the first robot will move, and being selected among the nodes within the area; and transmitting signal including the fourth information to the first robot, wherein the eighth nodes include nodes adjacent to the seventh nodes, and one of the seventh nodes is determined not to overlap one of the third or the fourth nodes.

11. A system of controlling a plurality of robots travelling in an area composed of a plurality of nodes, the system comprising: a memory; a communication unit configured to communicate with an external device including the plurality of robots; and one or more processors programmed to: determine first information including first nodes and second nodes in a map including a plurality of nodes based on a first path through which a first robot of the plurality of robots moves during a predetermined period of time, the first nodes including nodes constituting the first path and being selected among the plurality of nodes within the area, and each of the plurality of nodes representing a location in the map, and the second nodes include nodes adjacent to the first nodes and are determined according to size of the first robot, determine second information including third nodes and fourth nodes based on a second path through which a second robot of the plurality of robots moves during the predetermined period of time, the third nodes including nodes constituting the second path and being selected among the nodes within the area, and the fourth nodes include nodes adjacent to the third nodes and are determined according to size of the second robot, determining whether any of the first nodes overlap with one of the third nodes or the fourth nodes; and transmit signal including the first information to the first robot and signal including the second information to the second robot in response to determining that none of the first nodes overlap with one of the third nodes or the fourth nodes.

12. The system of claim 11, wherein the one or more processors is further programmed to receive a request for the first information and the second information.

13. The system of claim 11, wherein the first nodes include nodes through which other robots cannot travel by the movement of the first robot, and the third nodes include nodes through which other robots cannot travel by the movement of the second robot.

14. The system of claim 11, wherein the number of the second node is determined according to a presence or absence of an object related to a task of the first robot located proximate to the first nodes, and the number of the fourth nodes is determined according to the presence or absence of an object related to a task of the second robot located proximate to the third nodes.

* * * * *